United States Patent

Detable et al.

[11] Patent Number: 6,021,551
[45] Date of Patent: Feb. 8, 2000

[54] WIRE CLAMPING COLLAR

[75] Inventors: Pascal Detable, Gievres; Michel Andre, Romorantin-Lanthenay, both of France

[73] Assignee: Etablissements Caillau, Issy les Moulineaux, France

[21] Appl. No.: 09/214,103
[22] PCT Filed: Jul. 1, 1997
[86] PCT No.: PCT/FR97/01171
§ 371 Date: Dec. 29, 1998
§ 102(e) Date: Dec. 29, 1998
[87] PCT Pub. No.: WO98/00665
PCT Pub. Date: Jan. 8, 1998

[30] Foreign Application Priority Data

Jul. 1, 1996 [FR] France .................................... 96 08167
Nov. 22, 1996 [FR] France .................................... 96 14285

[51] Int. Cl.$^7$ .................................................. B65D 63/00
[52] U.S. Cl. .................................. 24/27; 24/20 R; 24/26; 24/29; 24/283
[58] Field of Search .................................... 24/27, 26, 29, 24/20 R, 23 R, 283

[56] References Cited

U.S. PATENT DOCUMENTS

| 0,302,202 | 7/1884 | Griswold | 24/27 |
| 0,302,243 | 7/1884 | Evans | 24/27 |
| 1,277,077 | 8/1918 | Ireland | 24/27 |
| 1,557,111 | 10/1925 | Rutledge | 24/27 |
| 4,041,931 | 8/1977 | Elliott et al. | 24/27 |
| 4,296,534 | 10/1981 | Nagano | 24/27 |
| 5,083,347 | 1/1992 | Bucciero | 24/27 |

FOREIGN PATENT DOCUMENTS

| 0344132 | 11/1989 | European Pat. Off. | 24/20 R |
| 0966525 | 10/1950 | France | 24/27 |
| 2 553 153 | 12/1985 | France . | |

Primary Examiner—Victor N. Sakran
Attorney, Agent, or Firm—Gary M. Nath; Gregory B. Kang; Nath & Associates

[57] ABSTRACT

A clamping collar (10) constituted by a semi-rigid wire that is rolled up to form at least one turn (11) with a first end (12) thereof being provided with a hook (16) extending transversely to the plane of the turn and with a second end (14) thereof being folded back outwardly to form an extension (26) lying substantially in the plane of the turn. The extension (26) includes a fastening fold (28) forming a setback going towards the center of the turn, and it also includes a pre-fastening fold (32) situated between that end (24) of the extension (26) which is connected to the turn (11) and the fastening fold (28), said pre-fastening fold being analogous to the fastening fold.

20 Claims, 2 Drawing Sheets

WIRE CLAMPING COLLAR

The present invention relates to a clamping collar constituted by a semi-rigid wire that is rolled up to form at least one turn.

The term "semi-rigid wire" is used to designate a wire made of a material that is sufficiently plastic to enable the wire to remain rolled up at rest, while still retaining a degree of elasticity. Such a material is, for example, a metal (spring steel, stainless steel, quenched steel, or any other suitable type of metal material), or any other material, in particular a synthetic material, possessing mechanical characteristics giving it a degree of rigidity.

The wire has a cross-section of a size that is comparable in all directions and that is very considerably smaller than its length. Typically, its section is circular or substantially circular.

Clamping collars are commonly used for clamping one object onto another, for example for clamping a rubber hose onto a rigid tubular endpiece.

Document FR-A-2 553 153 discloses a wire collar constituted by a semi-rigid wire rolled up to form two turns, a first end of the collar is provided with a hook, while a second end thereof is folded over to form an extension including a fastening surface for the hook. The hook is formed by a U-shaped fold forming a bridge between the two turns, while the extensions of the two turns themselves have respective small hooking turns whose ends comprise the fastening surface.

In one of the variants proposed in that document, in which each of the extensions is wound over two successive fastening turns, it is possible to obtain a position in which the hook lies inside the first fastening turn, thereby enabling pre-fastening to be obtained. To achieve this situation, it is necessary to reduce the diameter of the collar considerably since it is necessary to cause the hook to pass beneath the free ends of the extensions, i.e. beyond the normal fastening position, and to cause it to penetrate into the first fastening turns of the extensions. Thereafter, to reach the fastening position starting from the pre-fastening position, it is necessary to reduce the diameter of the collar and to ensure that the hook comes properly into position at the free ends of the extensions.

That collar suffers from several drawbacks. Firstly, it is not easy to obtain the pre-fastening position since bringing the hook beneath the fastening turns corresponds to a movement which is unnatural. Secondly, in the closed position of the collar, the retaining member for the hook is constituted by the curved outer periphery of the second fastening turn. This sole engagement is not secure and there is a high risk of the collar coming undone.

The present invention relates to a clamping collar of the above-mentioned type constituted by a semi-rigid wire rolled up to form at least one turn having a first end provided with a hook formed in a fold of the wire extending substantially transversely to the plane of the turn and a second end that is folded back outwardly to form an extension extending substantially in the same plane as the turn.

The invention seeks to remedy the drawbacks of the above-mentioned prior art by proposing pre-fastening that is easier to implement and fastening that is more secure.

This object is achieved by the fact that the extension includes a fastening fold forming a setback which, when considered in the direction going towards the free end of the extension, is directed towards the turn, and by the fact that said extension includes a pre-fastening fold situated between the end of the extension where it is connected to the turn, and the fastening fold thereof, the pre-fastening folds being likewise directed towards the turn.

It will be understood that by means of these dispositions, the pre-fastening position is obtained in a manner that is entirely natural, merely by causing the diameter of the turn to go from the diameter it presents in the open state to its pre-fastening diameter, which is greater than the diameter of the collar in the clamped state. While this is being done, there is no need at any time to bring the diameter of the collar down to a value that is smaller than its clamping diameter. In addition, both the pre-fastening position and the fastening position are secure since in both cases the hook cooperates with the base of a fold forming a setback.

Manufacture is simple since in addition to the conventional step of winding a metal wire to form one or more turns in order to make the periphery of the collar, it further comprises only folding steps to make firstly the hook and secondly the extension fitted with the fastening and pre-fastening folds. The wire can be work-hardened to a greater or lesser extent in order to impart a certain amount of resilience thereto and for the purpose of giving the hook and the extension their final shapes.

Because the collar is made of wire, its bearing area on the element to be clamped remains small. Because of this, and because of the positive clamping of the collar, the amount of compression to which the object to be clamped is subjected is therefore locally very high in the zone where the collar bears against the object, thus enhancing sealing against hard materials such as thermoplastics.

Advantageously, the pre-fastening fold is connected to the turn via a first substantially rectilinear ramp sloping towards the free end of the extension relative to a radius of the turn passing through that end of the extension which is connected to said turn. In this way, to go from the open state to the pre-fastened state, the hook naturally rises up the ramp. It is also advantageous for the fastening fold to be connected to the pre-fastening fold by a second substantially rectilinear ramp likewise inclined towards the free end of the extension relative to a radius of the turn passing through the end of the extension which is connected to said turn. This ramp likewise makes it possible for the hook to rise naturally when passing from the pre-fastening position to the fastening position.

When it is stated that the second end is folded back outwardly, that means that the extension is to be found adjacent to the outer periphery of the collar, as opposed to adjacent to its inner periphery.

The wire can be wound through a single turn between a first end situated in the vicinity of the hook and a second end situated at the free end of the extension.

The collar of this embodiment can be manufactured very simply with a small quantity of metal.

However, in numerous applications, it is advantageous for the wire to be wound into two turns that are similar and substantially parallel. Under such circumstances, a bridge can be formed between the two turns in the hook region, or else in the region of the free ends of the extensions. Such a collar is practically equivalent to a more conventional collar made from a rolled-up strip of metal. Its width is determined by the size of the bridge between the two turns and it presents the above-mentioned advantages because its flaring area against the inserted element is small.

The invention will be well understood and its advantages will appear more clearly on reading the following detailed description of embodiments given as non-limiting examples.

The description refers to the accompanying drawings, in which.

Figure 1:
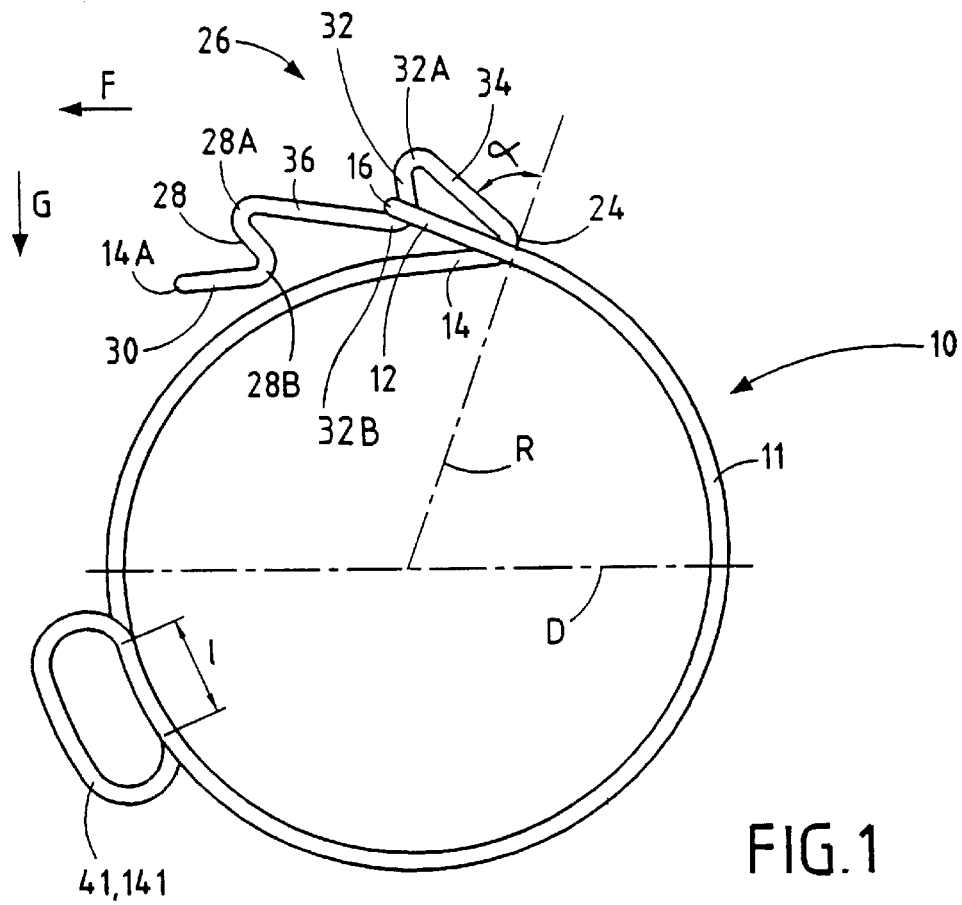
FIG. 1 is a front elevation view of a wire collar of the invention in its pre-fastening position.
Figures 2, 4, 5:
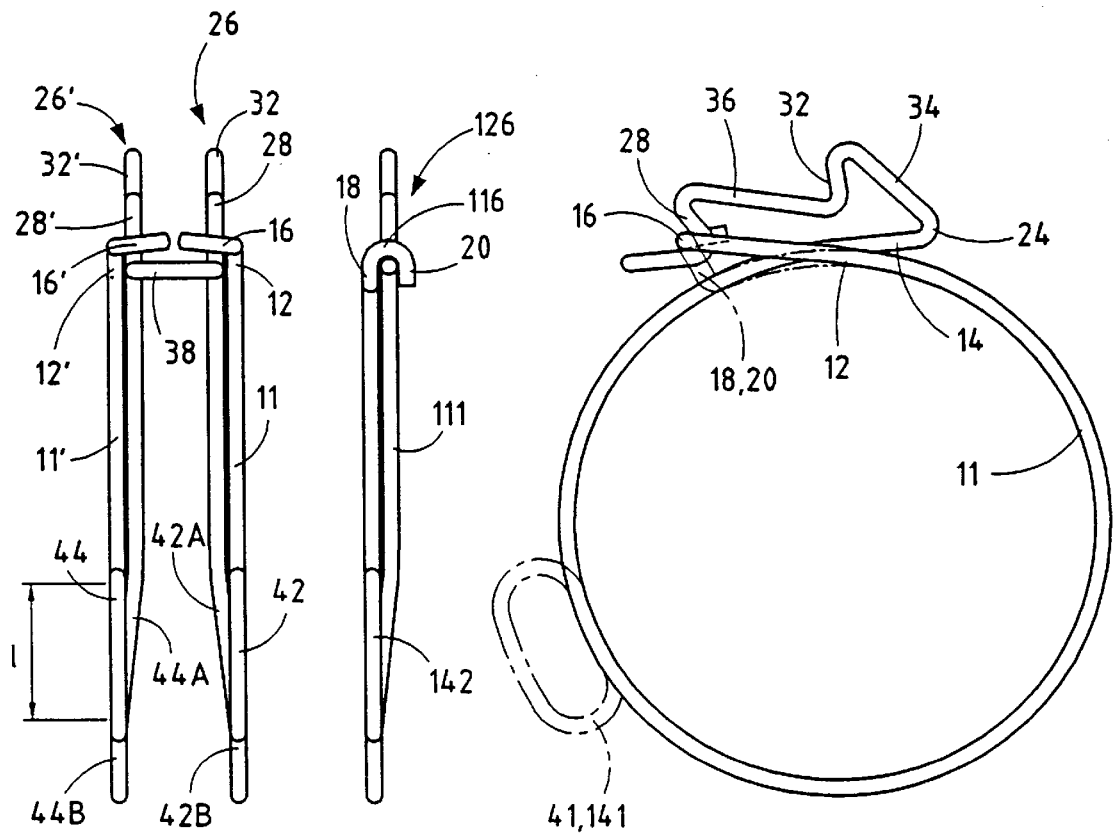
FIG. 2 is a view analogous to FIG. 1 showing a collar in its fastening position.
FIG. 4 is a side view of FIG. 2, likewise for a two-turn collar.
FIG. 5 is a view analogous to FIG. 4, but for a collar having a single turn.
Figure 3:
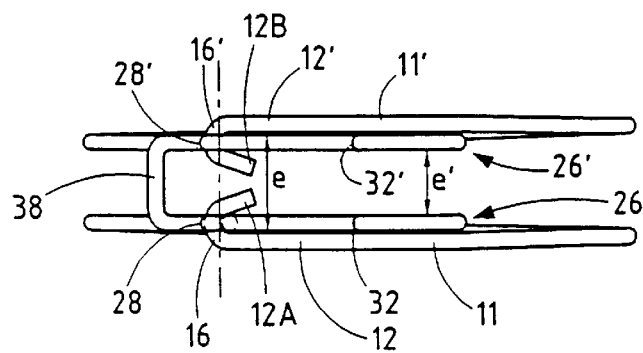
FIG. 3 is a plan view of FIG. 2 for a two-turn collar.

The collar 10 of FIGS. 1 and 2 is constituted by a metal wire that is rolled up to form at least one turn 11. As can be seen in FIGS. 3 and 4 or in FIG. 5 the collar may have two similar parallel turns 11 and 11' or only a single turn 111.

The turn 11 visible in FIGS. 1 and 2 has a first end 12 provided with a hook 16 which, as can be seen more clearly in FIG. 3, is formed by folding the wire substantially transversely to the plane of the turn. To enhance continuity of thrust from the collar onto the object it is clamping, the hook 16 may be slightly raised radially relative to the periphery of the turn 11. To do this, as shown in chain-dotted lines in FIG. 2, and as shown in FIG. 5, the end 12 may include a first radial fold 18 going away from the periphery of the turn, followed by the hook 116 which is directed transversely relative to the turn, and by a second radial fold 20 parallel to the fold 18 and extending in the opposite direction, the second radial fold optionally being followed by a portion that is substantially tangential to the periphery of the collar and that extends away from the end 12 towards the end 14 of the turn. This shape makes it possible to form a hook that projects radially without creating a sharp projection with the free end of the wire.

The second end 14 of the turn is folded back in a fold zone 24. Beyond said zone 24 an extension 26 overlies the portion of the turn adjacent to the second end 14, i.e. it extends in the direction F going away from the second end 14 towards the first end 12 of the turn when travelling around the periphery thereof. Between its end 24 (the fold zone) where it is connected to the turn and its free end 14A, the extension 26 has a fastening fold 28 forming a setback which, considered going from the end 24 towards the end 14A, is directed towards the turn. It can also be considered that this setback is formed in a fold directly in the direction G going towards a diameter D of the collar. This fastening fold 28 is directed substantially radially relative to the turn. Going from its end 28A close to the end 24 of the extension and towards its end 28B close to the free end 14A of the extension, this fold has gone towards the turn. Beyond the end 28B, the extension has a portion 30 that is substantially parallel to a diameter D of the collar. Thus, taken together, the setback 28 and the portion 30 are substantially L-shaped.

The extension 26 also has a pre-fastening fold 32 situated between the end 24 of said extension and the fastening fold 28. This pre-fastening fold 32 is substantially parallel to the fastening fold 28, i.e. it extends towards the center of the turn between a first end 32A close to the end 24 of the extension and a second end 32B.

The pre-fastening fold 32 is connected to the turn via a first substantially rectilinear ramp 34 inclined at an angle a towards the free end 14A of the extension relative to a radius R of the turn passing through the end 24 of the extension. This angle α preferably lies in the range 40° to 70°. To go from the open position of the collar to its pre-fastening position, the hook 16 "rises" up the ramp 34 until it has gone past the end 32A of the pre-fastening fold 32 and it then catches against the inside end (the bottom) 32B of this fold.

It can also be seen in FIGS. 1 and 2 that a second ramp 36 extends from the pre-fastening fold 32 to the fastening fold 28. This second ramp is advantageously substantially parallel to the first.

To go from the open position of the collar to its pre-fastening position, and then from said position to its fastening position, it suffices to urge the two ends of the collar in the direction that tends to reduce the diameter of the turn, until the hook 16 goes beyond the end 32A of the pre-fastening fold, and then beyond the end 28A of the fastening fold.

Depending on the degree of work-hardening in the fold zone 24, the natural position of the extension 26 can be slightly further away from the periphery of the turn than its fastened position. Under such circumstances, fastening the hook 16 in the fastening fold 28 urges the extension 26 resiliently towards the periphery of the turn away from the natural position of the extension. Because of this resilient co-operation, fastening and pressure of the collar against the object to be clamped are both reinforced. In addition, since the fastening fold is substantially radial, it becomes slightly inclined, i.e. its bottom 28B is closer to the fold 24 than is its top 28A. In other words, when the hook 16 passes over the top 28A of the fastening fold, the diameter of the turn is then very slightly smaller than the diameter it presents when the hook 16 is engaged in the bottom 28B of the fold 28. Consequently, any untimely release is avoided.

Conventionally, the collar is placed in its pre-fastening position at the end of manufacture, thereby enabling a plurality of collars to be transported and stored without any risk of tangling.

FIGS. 3 and 4 show that the collar of FIGS. 1 and 2 can be rolled to have two turns 11 and 11' that are similar and substantially parallel. Thus, each of the first ends 12 and 12' of these turns has a respective hook 16 or 16'. In contrast, the second ends 14 and 14' of the hooks are folded back to form respective extensions 26 and 26' analogous to the above-described extension 26, i.e. having fastening folds 28 and 28', and pre-fastening folds 32 and 32'.

Naturally, the hooks 16 and 16' and the folds 28 and 28' and the folds 32 and 32' are in respective alignments in directions T extending transversely to the plane of the turns.

In the variants of FIGS. 3 and 4, the wire is wound between a first end 12A which forms the hook 16 of one of the turns (11) and a second end 12B which forms the hook 16' of the other turn (11'). The changeover from one turn to the other takes place at the free ends of the extensions 26 and 26', with the wire extending substantially transversely to the plane of the turns between them to form a bridge 38. Relative to each other, the two hooks are free to move transversely to the plane of the turns.

The two hooks 16 and 16' preferably extend towards the inside of the collar, i.e. the free ends 12A and 12B extend towards each other and extend between the two extensions 26 and 26'. This has a first advantage of preventing the ends 12A and 12B constituting sharp edges that might be caught by mistake. They have a further advantage of making it easy to fasten the collar by means of a pair of pliers with a first jaw bearing against the bridge 38 and a second jaw bearing against the free ends 12A and 12B. In this case, the second jaw should be shaped so as to guide the hooks 16 and 16' and assist them in moving down towards the bottom of the fastening folds 28.

In the variant of FIGS. 3 and 4, the extensions of the two turns extend between the portions of the turns which carry the hooks, i.e. the spacing e of the turns in the region of the hooks is greater than the spacing e' of the turns in the region of the extensions. The spacing e is substantially equal to the sum of the spacing e' plus the thicknesses of the turns.

It should be observed that the bridge 38 serves as a spacer member defining the spacing e'.

If it is also desired to maintain the spacing between the turns in a region other than that which includes the bridge formed by the wire extending between the turns, it is possible to add a spacer member to the collar, e.g. in the form of a clip connected to each of the turns, with the ends of the clip being crimped around the turns or being snap-fastened thereon.

Figure 6:
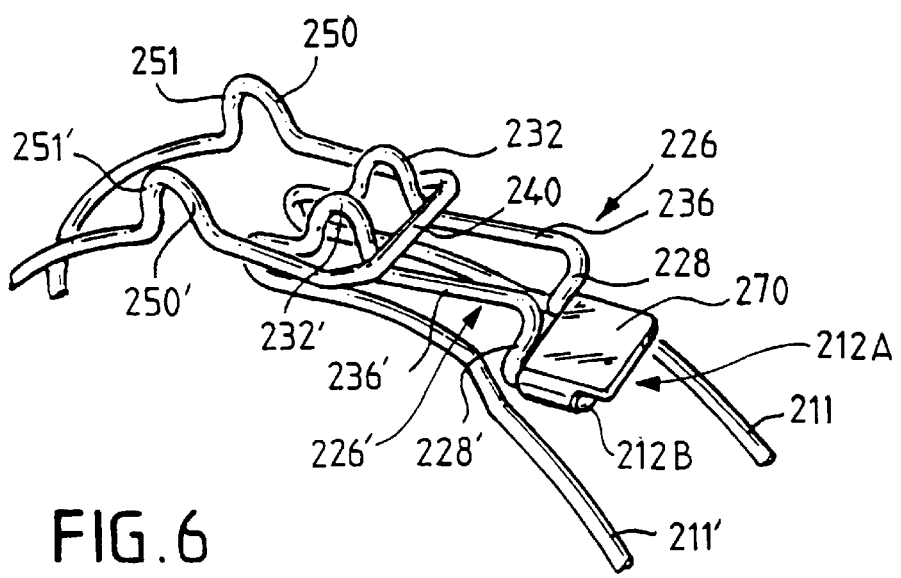
FIG. 6 is a fragmentary perspective view of a variant embodiment of a two-turn collar.

In the variant of FIG. 6, the wire can be wound continuously from a first end 212A situated at the free end of the extension 226 of one of the turns (211) to a second end 212B situated at the free end of the extension 226' of the other turn (211'), with the hooks being formed by a bridge 240 which extends between the two turns. This bridge is made so as to maintain spacing e greater than the spacing e' so as to make fastening possible. In this variant, if it is desired to protect the free ends of the wire situated at the ends of the extensions, it is possible to use a protection member 270 such as a holding plate of plastics material or of metal which is snap-fastened or crimped onto said free ends. Such a plate also serves as a spacer member for keeping the spacing between the turns constant in the region of the free ends of the extensions, and it does not interfere in any way with the clamping provided by the collar since it is situated in a region of the collar which does not come into contact with the object to be clamped. In addition, given the shape of such a plate, it can constitute a medium for marking the collar (name, diameter, ...) and/or a medium for a marker, e.g. in the form of an identifying color. In this variant, the fastening folds 228 and 228' are formed in the manner mentioned above, and they are preceded by respective rectilinear ramps 236 and 236'. The folded-back extensions 226 and 226' have undulations 232 and 232' which are in transverse alignment relative to the collar and which form the pre-fastening folds by means of their faces closer to the fastening folds.

Respective undulations 250 and 250' are formed at the opposite ends of the turns. The rear faces 251 and 251' of these undulations serve as bearing surfaces for a jaw of pliers for fastening the clamp, with the other jaw of the pliers bearing against the tops of the undulations 232 and 232', or beyond them.

The collar of the invention advantageously includes extra wire suitable for drawing on to increase its diameter. In the two-turn collar, this extra 41 is made up of two loops respectively 42 and 44 forming a e-shape substantially in the plane of the corresponding turns 11 and 11', and projecting radially relative thereto. Both of the loops 42 and 44 have the same extra length of wire and this extra length of wire 41 can be used to increase the diameter of the collar 10, should that be necessary. This can be the case, for example, when the inserted object expands under the effect of possible changes in temperature. The extra length may be elastic so as to accompany such variations in temperature both when shrinking (decreasing diameter) and when expanding (increasing diameter). It can also be advantageous during fastening whether elastically or otherwise to make it possible for the hooks 16 and 16' to be moved into the fastening folds. The extra length can also be constituted by an undulation (not shown) formed by bending the wire into a W-shape. The two limbs of the loops (42A & 42*b* for the loop 42, and 44A & 44B for the loop 44) advantageously overlap over a length l where their general shape matches that of the periphery of the collar. This length is determined in such a manner that regardless of the amount of extra wire that is used up, there remains a portion of the limbs having the same general shape as the periphery of the collar, so that the collar continues to bear on the object to be clamped without discontinuity in the region of the extra wire 41.

Having extra wire 41 corresponds to a variant. It is represented by chain-dotted lines in FIG. 2 and it is not shown in FIG. 3.

FIG. 5 is a view analogous to FIG. 4 and shows a collar that has only one turn. This turn 111 has a first end with a hook 116 and a second end with a folded-back extension 126. As a variant, the hook 116 is shown projecting radially, being carried by the above-mentioned radial folds 18 and 20. The extension 126 is analogous to the extension 26 of FIG. 1 and thus corresponds to the pre-fastening fold and the fastening fold. The turn 111 is wound between a first end situated at the free end of the hook and a second end situated at the free end of the extension. In a variant, this collar may be provided with an extra length of wire 141 comprising a loop 142 analogous to the loops 42 and 44 described above with reference to FIG. 4.

What is claimed is:

1. A clamping collar constituted by a semi-rigid wire rolled up to form at least one turn having a first end provided with a hook formed in a fold of the wire extending substantially transversely to a plane of the turn and a second end that is folded back outwardly to form an extension extending substantially in the same plane as the turn, the extension including a fastening fold forming a setback which, when considered in a direction going towards a free end of the extension, is directed towards the turn, said extension further including a pre-fastening fold situated between an end of the extension which is connected to the turn and said fastening fold, the pre-fastening fold being likewise directed towards the turn, said pre-fastening fold being connected to the turn via a first substantially rectilinear ramp sloping towards the free end of the extension relative to a radius of the turn passing through that end of the extension which is connected to said turn.

2. A collar as claimed in claim 1, wherein the fastening fold is connected to the pre-fastening fold via a second substantially rectilinear ramp inclined towards the free end of the extension relative to a radius of the turn passing through that end of the extension which is connected to said turn.

3. A collar as claimed in claim 1, wherein the wire is wound so as to form two turns that are substantially parallel and similar, each of said turns having a hook and an extension.

4. A collar as claimed in claim 3, including at least one spacer member connected to each of the two turns and holding said two turns spaced apart from each other.

5. A collar as claimed in claim 3, wherein the wire is wound between a first end forming the hook of one of the turns and a second end forming the hook of the other turn, and wherein between the free ends of the extensions of the two turns, the wire extends substantially transversely to a plane of the turns, to form a bridge.

6. A collar as claimed in claim 3, wherein the wire is wound from a first end situated at the free end of the extension of one of the turns to a second free end situated at the free end of the extension of the other turn, with the hooks being formed in a bridge extending between the two turns, a spacing of the two turns in a region of the hook-forming bridge being greater than a spacing between the turns in a region of their extensions, to enable said extensions to be inserted beneath said bridge.

7. A collar as claimed in claim 3, wherein it includes extra wire suitable for being drawn upon to increase a diameter of the collar.

8. A collar as claimed in claim 7, wherein said extra wire is in the form of two loops respectively formed in each of said two turns, extending substantially in a same plane as the turn, and projecting radially outwards therefrom.

9. A collar as claimed in claim 1, wherein it includes extra wire suitable for being drawn upon to increase a diameter of the collar.

10. A collar as claimed in claim 9, wherein said extra wire is in the form of a loop formed in said at least one turn, extending substantially in a same plane as the turn, and projecting radially outwards therefrom.

11. A clamping collar constituted by a semi-rigid wire rolled up to form at least one turn having a first end provided with a hook formed in a fold of the wire extending substantially transversely to a plane of the turn and a second end that is folded back outwardly to form an extension extending substantially in the same plane as the turn, the extension including a fastening fold forming a setback which, when considered in a direction going towards a free end of the extension, is directed towards the turn, said extension further including a pre-fastening fold situated between an end of the extension which is connected to the turn and said fastening fold, the pre-fastening fold being likewise directed towards the turn, the fastening fold being connected to the pre-fastening fold via a second substantially rectilinear ramp inclined towards the free end of the extension relative to a radius of the turn passing through that end of the extension which is connected to said turn.

12. A collar as claimed in claim 11, wherein the pre-fastening fold is connected to the turn via a first substantially rectilinear ramp sloping towards the free end of the extension relative to a radius of the turn passing through that end of the extension which is connected to said turn.

13. A collar as claimed in claim 11, wherein the wire is wound so as to form two turns that are substantially parallel and similar, each of said turns having a hook and an extension.

14. A collar as claimed in claim 13, including at least one spacer member connected to each of the two turns and holding said two turns spaced apart from each other.

15. A collar as claimed in claim 13, wherein the wire is wound between a first end forming the hook of one of the turns and a second end forming the hook of the other turn, and wherein between the free ends of the extensions of the two turns, the wire extends substantially transversely to a plane of the turns, to form a bridge.

16. A collar as claimed in claim 13, wherein the wire is wound from a first end situated at the free end of the extension of one of the turns to a second free end situated at the free end of the extension of the other turn, with the hooks being formed in a bridge extending between the two turns, a spacing of the two turns in a region of the hook-forming bridge being greater than a spacing between the turns in a region of their extensions, to enable said extensions to be inserted beneath said bridge.

17. A collar as claimed in claim 13, wherein it includes extra wire suitable for being drawn upon to increase a diameter of the collar.

18. A collar as claimed in claim 17, wherein said extra wire is in the form of two loops respectively formed in each of said two turns, extending substantially in a same plane as the turn, and projecting radially outwards therefrom.

19. A collar as claimed in claim 11, wherein it includes extra wire suitable for being drawn upon to increase a diameter of the collar.

20. A collar as claimed in claim 19, wherein said extra wire in the form of a loop formed in said at least one turn, extending substantially in a same plane as the turn, and projecting radially outwards therefrom.

* * * * *